United States Patent
Payne

(10) Patent No.: US 10,017,172 B2
(45) Date of Patent: Jul. 10, 2018

(54) SYSTEM AND METHOD FOR PULSING DISPLAY TO PROVIDE COASTING COACH GUIDANCE

(71) Applicant: Toyota Motor Engineering & Manufacturing North America, Inc., Erlanger, KY (US)

(72) Inventor: Joshua D. Payne, Ann Arbor, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 59 days.

(21) Appl. No.: 15/342,034

(22) Filed: Nov. 2, 2016

(65) Prior Publication Data

US 2018/0118189 A1    May 3, 2018

(51) Int. Cl.
*B60W 20/12* (2016.01)
*G01C 21/20* (2006.01)
(Continued)

(52) U.S. Cl.
CPC .............. *B60W 20/12* (2016.01); *B60L 7/10* (2013.01); *B60L 11/14* (2013.01);
(Continued)

(58) Field of Classification Search
CPC .............. B60W 20/12; B60W 50/14; B60W 2050/146; B60W 2420/42; B60W 2420/50; B60W 2520/04; B60W 2520/105; B60W 2710/0677; B60W 2710/086; B60L 7/10; B60L 11/14; B60L 11/1851;
(Continued)

(56) References Cited

U.S. PATENT DOCUMENTS 5,239,472 A    8/1993  Long et al.
5,815,072 A    9/1998  Yamanaka et al.
(Continued)

FOREIGN PATENT DOCUMENTS

DE    102010038106    4/2012

OTHER PUBLICATIONS

Coleman et al., Coasting boards vs optimalcontrol, 2010, IEEE, p. 1-5.*

(Continued)

*Primary Examiner* — McDieunel Marc
(74) *Attorney, Agent, or Firm* — Snell & Wilmer LLP

(57) ABSTRACT

Methods, systems, and apparatus for providing coasting guidance for a vehicle and improving visibility of the indicator, on the display, to indicate to the driver to begin coasting. The coasting guidance system includes a display configured to display an indicator to a driver to begin coasting. The coasting guidance system includes an electronic control unit coupled to the display. The electronic control unit is configured to determine a location of a stop event for the vehicle and determine a braking location for the vehicle based on the location of the stop event for the vehicle. The electronic control unit is configured to determine an ideal coasting location for the vehicle based on the braking location for the vehicle and cause an indicator on the display to pulse at or within a threshold distance of the ideal coasting location to indicate to the driver to begin coasting.

20 Claims, 5 Drawing Sheets

(51) Int. Cl.
*B60L 7/10* (2006.01)
*B60L 11/14* (2006.01)
*B60L 11/18* (2006.01)
*B60W 50/14* (2012.01)

(52) U.S. Cl.
CPC .......... *B60L 11/1851* (2013.01); *B60W 50/14* (2013.01); *G01C 21/20* (2013.01); *B60L 2240/40* (2013.01); *B60L 2240/62* (2013.01); *B60L 2250/16* (2013.01); *B60W 2050/146* (2013.01); *B60W 2420/42* (2013.01); *B60W 2420/52* (2013.01); *B60W 2520/04* (2013.01); *B60W 2520/105* (2013.01); *B60W 2710/0677* (2013.01); *B60W 2710/086* (2013.01); *B60Y 2300/18066* (2013.01); *B60Y 2300/91* (2013.01); *B60Y 2400/112* (2013.01); *B60Y 2400/92* (2013.01); *Y10S 903/93* (2013.01)

(58) Field of Classification Search
CPC ............. B60L 2250/16; B60L 2240/40; B60L 2240/62; B60Y 2300/18066; B60Y 2400/112; B60Y 2300/91; B60Y 2400/92; G01C 21/20; Y10S 903/93
USPC .......................................................... 701/22
See application file for complete search history.

(56) References Cited

U.S. PATENT DOCUMENTS

| | | | |
|---|---|---|---|
| 6,694,806 B2 | 2/2004 | Kumagai et al. | |
| 7,237,203 B1 | 6/2007 | Kuenzner | |
| 7,848,867 B2 * | 12/2010 | Ueno | B60K 6/48 701/70 |
| 8,187,149 B2 * | 5/2012 | Koenig | B60W 10/115 477/115 |
| 8,680,979 B2 * | 3/2014 | Hoffmeister | B60K 35/00 340/438 |
| 8,767,379 B2 | 7/2014 | Whitaker | |
| 8,849,507 B2 | 9/2014 | Popp et al. | |
| 8,994,524 B2 | 3/2015 | Fritz et al. | |
| 9,050,935 B2 | 6/2015 | Stefan et al. | |
| 9,896,106 B1 * | 2/2018 | Wrobel | B60W 30/18154 |
| 9,898,928 B1 * | 2/2018 | Payne | G08G 1/0967 |
| 2012/0078496 A1 | 3/2012 | Lindhuber et al. | |
| 2014/0324317 A1 | 10/2014 | Schilling et al. | |
| 2016/0101780 A1 | 4/2016 | Park | |

OTHER PUBLICATIONS

Ulasim et al., Coasting point optimisation for mass rail transit lines using artificial neural networks and genetic algorithms, 2007, IEEE, p. 172-182.*

Nozaki et al. "Effect of Active Effort in Eco-Driving Support System on Proficiency of Driving Skill" *SICE Annual Conference 2012*; pp. 646-651; Aug. 20, 2012.

Kircher et al. "Continuous Versus Intermittent Presentation of Visual Eco-driving Advice" *Transportation Research Part F*; pp. 27-38; 2014.

* cited by examiner

SYSTEM AND METHOD FOR PULSING DISPLAY TO PROVIDE COASTING COACH GUIDANCE

BACKGROUND

1. Field

This specification relates to a system and a method for providing coasting guidance for a vehicle.

2. Description of the Related Art

Drivers may increase fuel efficiency by adjusting their driving behavior. For example, a driver may coast while driving to conserve fuel. Vehicle coasting involves allowing the vehicle to progress, propel or otherwise move without use of propelling power. That is, the driver may drive without engaging the vehicle's engine or battery. For example, the vehicle may move using inertia and/or gravity. By relying on inertia and/or gravity to propel the vehicle, the vehicle does not consume fuel or electrical energy to propel the vehicle.

A vehicle that coasts towards a stop sign may require additional braking to completely stop or slow the vehicle. A driver lacks the ability to gauge when to begin coasting to stop at or within proximity of the stop sign. For example, if the driver begins to coast too early, the vehicle may stop before reaching the stop sign or if the driver begins to coast too late, the driver may have to apply both the regenerative brakes and/or energy dissipation brakes, such as hydraulic brakes or friction brakes, to stop at the stop sign. The application of energy dissipation brakes results in the loss of energy that could have been captured by the regenerative brakes and stored.

Since the driver lacks the ability to gauge when to begin coasting to stop at or within proximity of a stop event, such as a stop sign, the driver needs to be informed of when to begin coasting. Moreover, while driving, the driver's attention is focused on operating the vehicle so the indicator that indicates when to begin coasting must be noticeable.

Accordingly, there is a need for a system and method for providing coasting guidance information to the driver to assist the driver in identifying the ideal coasting location to begin coasting and improving visibility of the coasting indicator that notifies the driver to begin coasting.

SUMMARY

In general, one aspect of the subject matter described in this specification is embodied in a coasting guidance system for a vehicle. The coasting guidance system includes a display configured to display an indicator to a driver to begin coasting. The coasting guidance system includes an electronic control unit coupled to the display. The electronic control unit is configured to determine a location of a stop event for the vehicle and determine a braking location for the vehicle based on the location of the stop event for the vehicle. The electronic control unit is configured to determine an ideal coasting location for the vehicle based on the braking location for the vehicle and cause an indicator on the display to pulse at or within a threshold distance of the ideal coasting location to indicate to the driver to begin coasting.

These and other embodiments may optionally include one or more of the following features. The coasting guidance system may include one or more sensors. The one or more sensors may include an acceleration input sensor that monitors an applied amount or percentage of acceleration. The electronic control unit may be configured to obtain the applied amount or percentage of acceleration from the one or more sensors. The electronic control unit may be configured to render a display having a first indicator that corresponds to a recommended amount or percentage of total vehicle power and a second indicator that corresponds to the applied amount or percentage of acceleration that is obtained from the one or more sensors. The first indicator may have a filled region of a first size that corresponds to a recommended amount or percentage of total vehicle power. The electronic control unit may be configured to increase the recommended amount or percentage of total vehicle power to a first threshold value within a first time period so that the first indicator increases in size to cause the indicator of the display to pulse. The electronic control unit may decrease the recommended amount or percentage of total vehicle power to a second threshold value within a second time period so that the first indicator decreases in size in response to the recommended amount or percentage of total vehicle power reaching or exceeding the first threshold value within the first time period. The first threshold value may be greater than the second threshold value. The electronic control unit may asymptotically increase the recommended amount or percentage of total vehicle power to the first threshold value, and after reaching or exceeding the first threshold value, asymptotically decrease the recommended amount or percentage of total vehicle power to the second threshold value.

The coasting guidance system may include at least one of a navigation unit configured to provide navigational map information or a memory configured to store a plurality of locations of stop events. The electronic control unit may be configured to obtain, from the navigation unit, the navigational map information, and may determine the location of the stop event based on the navigational map information or the plurality of locations of stop events stored in the memory to determine the location of the stop event.

In another aspect, the subject matter is embodied in a method for displaying coasting guidance information on a vehicle. The method may include determining a location of a stop event and determining a braking location based on the location of the stop event. The method may include determining an ideal coasting location based on the braking location. The method may include rendering a display. The display may have one or more indicators to indicate to a driver to begin coasting.

In another aspect, the subject matter is embodied in a coasting guidance system of a vehicle. The coasting guidance system may include a memory configured to store a plurality of locations of stop events. The coasting guidance system may include a display configured to display one or more indicators to a driver to perform an operation. The coasting guidance system may include an electronic control unit coupled to the display and the memory. The electronic control unit may be configured to determine a location of a stop event based on a current location of the vehicle and the plurality of locations of stop events. The electronic control unit may be configured to determine a braking location based on the location of the stop event. The electronic control unit may be configured to determine an ideal coasting location based on the braking location. The electronic control unit may be configured to determine that a recommended amount or percentage of total vehicle power is less than a threshold amount or percentage, and cause an indicator of the display to pulse at or within a threshold distance of the ideal coasting location.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles and methods for providing coasting guidance for a vehicle. Particular embodiments of the subject matter described in this specification may be implemented to realize one or more of the following advantages. A coasting guidance system notifies a driver of an ideal coasting location and displays an indicator to the driver of the vehicle. The coasting guidance system displays an indicator at or within a threshold distance of the ideal coasting location to notify the driver of when to begin coasting. By notifying the driver of when to begin coasting, the coasting guidance system maximizes coasting of the vehicle.

Other benefits and advantages include adjusting an existing indicator to improve noticeability which allows the driver to concentrate on driving, and when the vehicle approaches the ideal coasting location, briefly but noticeably inform the driver to begin coasting without distracting the driver. The coasting guidance system may adjust the existing indicator to pulse to improve the noticeability. By improving the noticeability of the indicator, the driver is better able to notice the indicator and begin coasting.

Additionally, the coasting guidance system may use an existing indicator that the driver is familiar with to indicate that the driver is at or within a threshold distance of the ideal coasting location. By altering an existing indicator that the driver is familiar with, the driver's focus is not distracted by multiple indicators. Moreover, by using a single indicator, the indication is more noticeable with less distraction.

Figure 1:
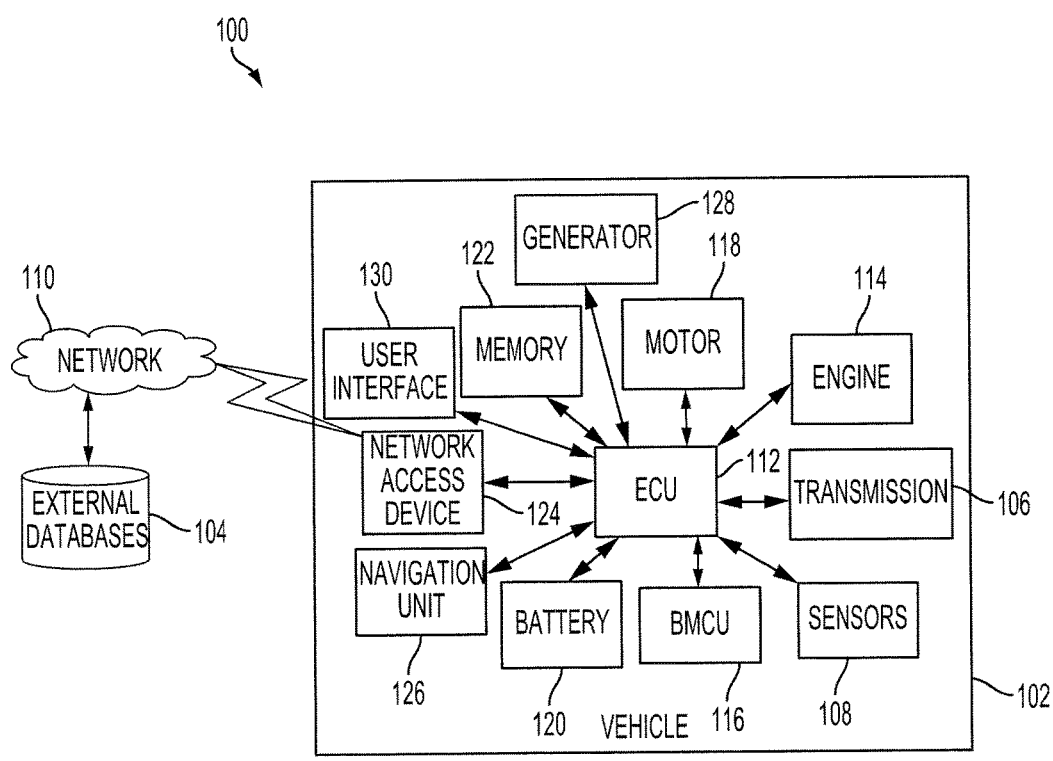
FIG. 1 is a block diagram of an example coasting guidance system for a vehicle according to an aspect of the invention.

FIG. 1 is a block diagram of an example coasting guidance system 100 for a vehicle 102. The coasting guidance system 100 may include one or more computers or electronic control units (ECUs) 112, appropriately programmed, to control coasting in the vehicle 102. The coasting guidance system 100 may include a navigation unit 126, a user interface 130, a memory 122, one or more sensors 108, and/or a network access device 124.

Coasting involves the propulsion of the vehicle 102 without the use of fuel or electrical energy. Other forms of energy, such as inertia or gravity, may propel the vehicle 102. The coasting guidance system 100 may provide coasting information to a driver through the user interface 130, e.g., a display. The coasting information may include notifications, such as a notification that indicates to the driver to begin coasting, energy and mileage information related to the coasting, and/or distance information to an ideal coasting location and/or a braking location. The coasting guidance system 100 may control a deceleration drive force that controls the deceleration of a vehicle 102 while coasting.

The coasting guidance system 100 may be included in a vehicle 102 and connected to one or more external databases 104 through a network 110. A vehicle 102 is a conveyance capable of transporting a person, an object, or a permanently or temporarily affixed apparatus. A vehicle 102 may be a self-propelled wheeled conveyance, such as a car, sports utility vehicle, truck, bus, van or other motor or battery driven vehicle. For example, the vehicle 102 may be an electric vehicle, a hybrid vehicle, a plug-in hybrid vehicle or any other type of vehicle that includes a motor 118 and/or generator 128. Other examples of vehicles include bicycles, trains, planes, or boats, and any other form of conveyance that is capable of transportation. The vehicle 102 may be semi-autonomous or autonomous. That is, the vehicle 102 may be self-maneuvering and navigate without human input. An autonomous vehicle may use one or more sensors 108 and/or navigation unit 126 to drive autonomously.

The vehicle 102 may be coupled to a network 110. The network 110, such as a local area network (LAN), a wide area network (WAN), a cellular network, a digital short-range communication (DSRC), the Internet, or a combination thereof, connects the vehicle 102 and/or coasting guidance system 100 to the one or more external databases 104. The external databases 104 may include databases from different service providers. A service provider may provide navigational map, weather and/or traffic condition information to the vehicle 102.

A database is any collection of pieces of information that is organized for search and retrieval, such as by a computer, and the database may be organized in tables, schemas, queries, report, or any other data structures. A database may use any number of database management systems. An external database 104 may include a third-party server or website that stores or provides information. The information may include real-time information, periodically updated information, or user-inputted information. A server may be a computer in a network that is used to provide services, such as accessing files or sharing peripherals, to other computers in the network. A website may be a collection of one or more resources associated with a domain name.

Navigational map information includes political, traffic condition, roadway and construction information. Political information includes political features such as cities, states, zoning ordinances, and laws and regulations, and traffic signs. Roadway information includes road features such the grade of an incline of a road and/or the boundaries of one or more lanes that make up the roadway. Construction information includes construction features such as construction zones and construction hazards.

Traffic condition information includes one or more traffic condition features, such as a stop sign, traffic signal, traffic congested areas or accident areas. The traffic condition information may provide information related to the density and movement of vehicles on a roadway and/or accident locations. Traffic condition information may include real-time information of the traffic congested areas or accident areas. The real-time information may include the traffic in a particular lane. The traffic condition information may include state information of traffic signals, such as the state of a traffic signal. For example, real-time information of the color of a traffic signal may be obtained from a transportation system.

Features, e.g., road features, political features, or traffic condition features, each have a location that may be identified by map coordinates. The map coordinates may be defined by latitude and longitudinal coordinates.

The vehicle 102 may include an engine 114, a motor 118, a generator 128, a battery 120 and a battery management and control unit (BMCU) 116. The motor 118 and/or the generator 128 may be an electric motor and an electric generator that converts electrical energy into mechanical power, such as torque, and converts mechanical power into electrical energy. The motor 118 and/or the generator 128 may be coupled to the battery 120. The motor 118 and/or the generator 128 may convert the energy from the battery 120 into mechanical power, and may provide energy back to the battery 120, for example, via regenerative braking. The engine 114 combusts fuel to provide power instead of and/or in addition to the power supplied by the motor 118 and/or the generator 128.

The battery 120 may be coupled to the motor 118 and/or the generator 128 and may provide electrical energy to and receive electrical energy from the motor 118 and/or the generator 128. The battery 120 may include one or more rechargeable batteries.

The BMCU 116 may be coupled to the battery 120 and control and manage the charging and discharging of the battery 120. The BMCU 116, for example, may measure, using battery sensors (not shown), parameters used to determine the state of charge (SOC) of the battery 120.

The one or more ECUs 112 may be implemented as a single ECU or in multiple ECUs. The ECU 112 may be electrically coupled to some or all of the components of the vehicle 102. The ECU 112 may be coupled to at least one of the navigation unit 126, the one or more sensors 108, the network access device 124 or the memory 122. The ECU 112 may include one or more processors or controllers specifically designed for controlling one or more coasting guidance features, such as providing a notification to the driver and/or controlling one or more indicators to notify the driver of an ideal coasting location.

The memory 122 may be coupled to the ECU 112. The memory 122 may store instructions to execute on the ECU 112 and may include one or more of a RAM or other volatile or non-volatile memory. The memory 122 may be a non-transitory memory or a data storage device, such as a hard disk drive, a solid-state disk drive, a hybrid disk drive, or other appropriate data storage, and may further store machine-readable instructions, which may be loaded and executed by the ECU 112. The memory 122 may store the location of stop events.

The network access device 124 may include a communication port or channel, such as one or more of a Wi-Fi unit, a Bluetooth® unit, a Radio Frequency Identification (RFID) tag or reader, a DSRC unit, or a cellular network unit for accessing a cellular network (such as 3G or 4G). The network access device 124 may transmit data to and receive data from devices and systems not directly connected to the vehicle 102. For example, the ECU 112 may communicate with the external databases 104. Furthermore, the network access device 124 may access the network 110, to which the external databases 104 are also connected.

The one or more sensors 108 may be coupled to the ECU 112 and include a vehicle speed sensor, an acceleration input sensor, a brake sensor, and/or one or more proximity sensors. The vehicle speed sensor measures the speed of the vehicle 102, for example, by measuring the total revolutions of the wheel per minute. The brake sensor measures the amount of pressure applied to the brake pedal. The acceleration input sensor measures the amount of pressure applied to the accelerator pedal. The one or more proximity sensors may be positioned on the front and/or the rear of the vehicle 102 to detect surrounding vehicles and/or objects that are within a threshold distance of the vehicle 102 in the front and/or the back of the vehicle 102, respectively. The proximity sensor may use a radar, a camera, vehicle-to-vehicle (V2V) communication or other means to detect and/or measure a distance to the other vehicles or objects. The one or more sensors 108 may include one or more cameras that may be used to identify a driver to determine driver specific configurations to control the vehicle 102.

The navigation unit 126 may be coupled to the ECU 112 and provide vehicle information and/or navigation information to the ECU 112. The vehicle information may include the current location, direction and/or speed of the vehicle 102. The navigation information may include a route that the vehicle 102 is or will be travelling. The route may include a starting location, a destination location and/or a path between the starting location and the destination location.

Figure 2:
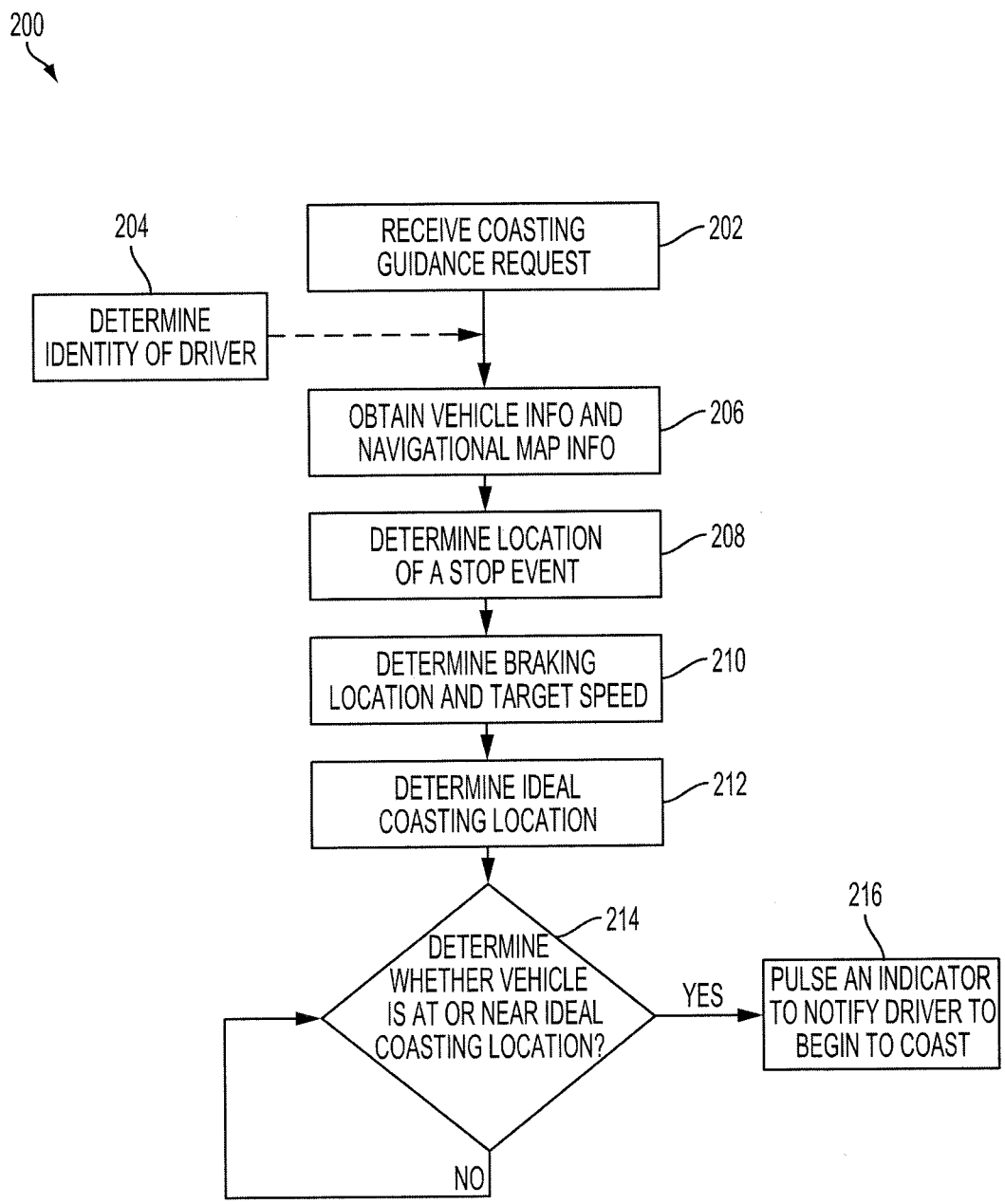
FIG. 2 is a flow diagram of an example process for pulsing an indicator to notify the driver to begin to coast according to an aspect of the invention.

FIG. 2 is a flow diagram of an example process 200 for pulsing an indicator to notify the driver to begin to coast. One or more computers or one or more data processing apparatuses, for example, the ECU 112 of the coasting guidance system 100 of FIG. 1, appropriately programmed, may implement the process 200.

The coasting guidance system 100 receives a coasting guidance request (202). The coasting guidance request is a request to initialize the coasting guidance system 100. The coasting guidance system 100 receives the coasting guidance request when the vehicle 102 becomes operational or when an occupant of the vehicle 102 activates the coasting guidance system 100.

The coasting guidance system 100 may receive the coasting guidance request from one or more sensors 108, such as an engine sensor, when the vehicle 102 is powered on. The coasting guidance system 100 may receive the coasting guidance request upon user activation, for example, when a token, such as a key, is inserted to start the vehicle 102.

The coasting guidance system 100 may determine an identity of a driver during initialization (204). The coasting guidance request may include the identity of the driver. The coasting guidance system 100 may receive user input, such as a user identification token, a user id or a fingerprint, which identifies the driver, to determine the identity of the driver. For example, a driver's key fob may uniquely identify the driver when the driver opens the door or is within proximity of the vehicle 102. In another example, the coasting guidance system 100 may obtain a user id from the driver, using the user interface 130, to identify the driver. The coasting guidance system 100 may use other user interface elements, such as a memory button that configures the position of a mirror or a seat, other sensors, such as a camera that uses facial recognition, or a combination of devices and/or techniques to identify the driver of the vehicle 102. The identity of the driver may be associated with a driver response time that is stored in the memory 122.

The coasting guidance system 100 obtains the vehicle information and the navigational map information (206). The coasting guidance system 100 may obtain the vehicle information from the navigation unit 126. For example, the navigation unit 126 may include a global positioning system (GPS) device that may track and provide a current location of the vehicle 102 and/or a current speed of the vehicle 102. In some implementations, the coasting guidance system 100 may obtain the vehicle information from a vehicle speed sensor that may provide the current speed of the vehicle 102.

The coasting guidance system 100 may obtain the navigational map information from the one or more external databases 104 through the navigation unit 126 and/or the ECU 112. The navigational map information includes the political, traffic condition, roadway and construction information. The navigation unit 126 and/or the ECU 112 may request navigation map information from the one or more external databases 104 through the network 110 and may receive a response with the navigational map information from the one or more external databases 104.

The coasting guidance system 100 determines the location of a stop event (208). A stop event may be a stop sign, a traffic signal, an accident location and/or a location where traffic is at a standstill. The coasting guidance system 100 may obtain the location of the stop event from navigational map information obtained by the navigation unit 126 from one or more external databases 104 or from one or more sensors 108. The navigation unit 126 may obtain navigational map information including the locations of one or more stop events, such as a stop sign, traffic, or a red traffic signal, from one or more external databases 104 through the network 110. The navigational map information may include real-time traffic signal information. If the navigational map information indicates that the stop event is a traffic light, the coasting guidance system 100 may determine from the real-time traffic signal information the color of the traffic light when the vehicle 102 arrives at the location of the traffic light. If the coasting guidance system 100 determines that the traffic light will be green, the coasting guidance system 100 may disregard the traffic light as a stop event and determine the location of the next stop event. The coasting guidance system 100 may adjust the location of the stop event based on traffic condition information, e.g., if one or more vehicles are stopped at the stop event. The traffic condition information may be obtained from the one or more sensors 108 or from the one or more external databases 104.

In some implementations, a sensor 108, such as a front vehicle proximity sensor, may be positioned on the front of the vehicle 102, and may be configured to detect a stop event, such as one or more vehicles in front of the vehicle 102 that are at a standstill. If the one or more vehicles that are at a standstill begin moving, the coasting guidance system 100 may determine the location of the next stop event.

In some implementations, the coasting guidance system 100 may determine the location of a stop event based on a stored location of a previously travelled stop event. In a previously travelled route, the coasting guidance system 100 may determine that the vehicle 102 is stopping based on the speed of the vehicle 102. That is, the coasting guidance system 100 may determine that the speed of the vehicle 102 is below a threshold speed, such as 4 mph, and is decreasing which may indicate that the vehicle is stopping. The coasting guidance system 100 may associate the location of the vehicle 102 with a stop event and store the stop event in the memory 122 so that if the vehicle 102 approaches the location on a subsequent route the coasting guidance system 100 recalls the location of the stored stop event by comparing the current location of the vehicle 102 with the location of the stored stop event that was stored. The coordinates of the vehicle 102 that are associated with the stored stop event and the current location of the vehicle 102 may be obtained using the navigation unit 126. The coasting guidance system 100 may count a number of times that the vehicle 102 stops or partially stops at a location or within a range of the location, and store the location as a stop event if the number of times that the vehicle 102 stops or partially stops at the location or within the range of the location is greater than or equal to a threshold value. A partial stop may be, for example, when the vehicle 102 slows down to turn but does not completely stop. The coasting guidance system 100 may decrease the number of times that the vehicle 102 stops or partially stops at a location or within the range of the location if the vehicle 102 drives through the location without stopping or partially stopping. The coasting guidance system 100 may forget or remove a stored stop event if the number of times that the vehicle 102 stops or partially stops at a location or within the range of the location is below a threshold value. The memory 122 may store a mapping between a location of a stop event and the frequency the vehicle 102 stops or partially stops at the location of the stop event.

In some implementations, one or more sensors 108 may detect if there are vehicles in front of the vehicle 102. If there are no vehicles in front of the vehicle 102, the coasting guidance system 100 may determine that the vehicle 102 is stopping due to a stationary stop event, such as a traffic sign, and not an arbitrary stop event, such as traffic, that may not be present in a subsequent route. The coasting guidance system 100 may differentiate between stationary and arbitrary stop events when storing the stop events. The coasting guidance system 100 may use a combination of stored stop events and/or navigational map information to determine the location of one or more stop events.

The coasting guidance system 100 determines a braking location and a target speed (210). The target speed and/or the braking location may be based on an approach speed determined from statistical analysis of driver behavior patterns associated with eco-braking. The target speed may be in a range of 5-8 mph, for example. The braking location may be based on a specific deceleration rate in which the vehicle 102 maintains regenerative braking. The braking location may be a location that maximizes the amount of energy that is recaptured by the regenerative brakes if the driver initiates braking at the braking location and the vehicle 102 is travelling at the target speed. That is, when the brake is depressed at the braking location and the vehicle 102 is travelling at the target speed, the vehicle 102 achieves full regenerative braking by ensuring that the braking power requested by the driver does not exceed the maximum regenerative power limit which maximizes the amount of energy that is captured by the regenerative brakes.

In some implementations, the coasting guidance system 100 may compensate for a rolling stop when the coasting guidance system 100 determines the braking location and the target speed. In some implementations, the coasting guidance system 100 may determine the braking location and the target speed further based on a road condition, such a road grade level, and/or the load of the vehicle 102.

The coasting guidance system 100 determines an ideal coasting location based on a current speed of the vehicle 102 and the braking location (212). The ideal coasting location is the location that maximizes coasting of the vehicle 102 to decelerate to the target speed at the braking location. The coasting guidance system 100 determines an ideal coasting location by calculating the distance needed for the vehicle 102 to decelerate using a pre-set deceleration drive force to reach the target speed at the braking location. The pre-set deceleration drive force may be based on a deceleration map and the current speed of the vehicle 102. In some implementations, the braking location and the location of the stop event are the same location, and the target speed is 0 mph.

The coasting guidance system determines whether the vehicle 102 is at or within a threshold distance of the ideal coasting location (214). The coasting guidance system 100 compares the current location of the vehicle 102 to the ideal coasting location. If the current location of the vehicle 102 is at or within a threshold distance of the ideal coasting location, the coasting guidance system 100 notifies the driver to begin coasting, for example, through the user interface 130. The threshold distance may be based on a driver response associated with an identity of the driver or may be pre-set, e.g., a distance of 15 feet. The coasting guidance system 100 indicates to the driver to begin to coast when the vehicle 102 is at or within the threshold distance of the ideal coasting location, e.g., by pulsing an indicator (216). The process of providing a pulsing indicator to notify the driver to begin to coast is further described in FIG. 3.

Figure 3:
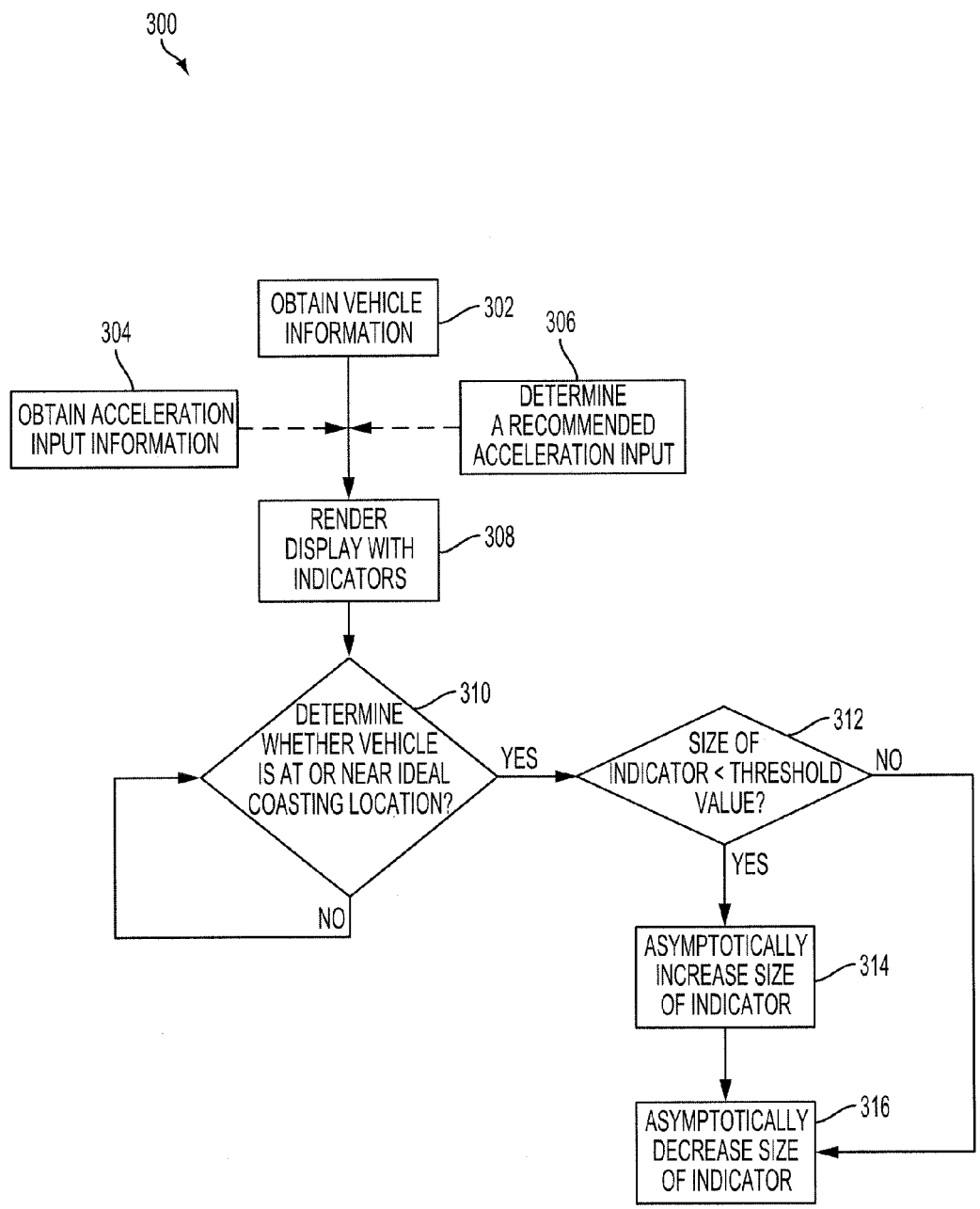
FIG. 3 is a flow diagram of an example process for generating the pulse of the indicator according to an aspect of the invention.

FIG. 3 is a flow diagram of an example process for generating the pulse of the indicator. One or more computers or one or more data processing apparatuses, for example, the ECU 112 of the coasting guidance system 100 of FIG. 1, appropriately programmed, may implement the process 300.

The coasting guidance system 100 obtains vehicle information including a current location of the vehicle 102 and a current speed of the vehicle 102, as discussed in step 206 (302). The coasting guidance system 100 may obtain acceleration input information including a current applied amount or percentage of acceleration from the one or more sensors 108, such as an acceleration input sensor (304). The coasting guidance system 100 may detect the amount or percentage of applied pressure to the accelerator using the acceleration input sensor. The amount or percentage of applied pressure to the accelerator may correspond with a current applied amount or percentage of acceleration. The coasting guidance system 100 may determine a recommended acceleration input that indicates a recommended amount or percentage of total vehicle power that the driver is recommended to attain to maintain the current speed of the vehicle 102 (306).

Figure 4:
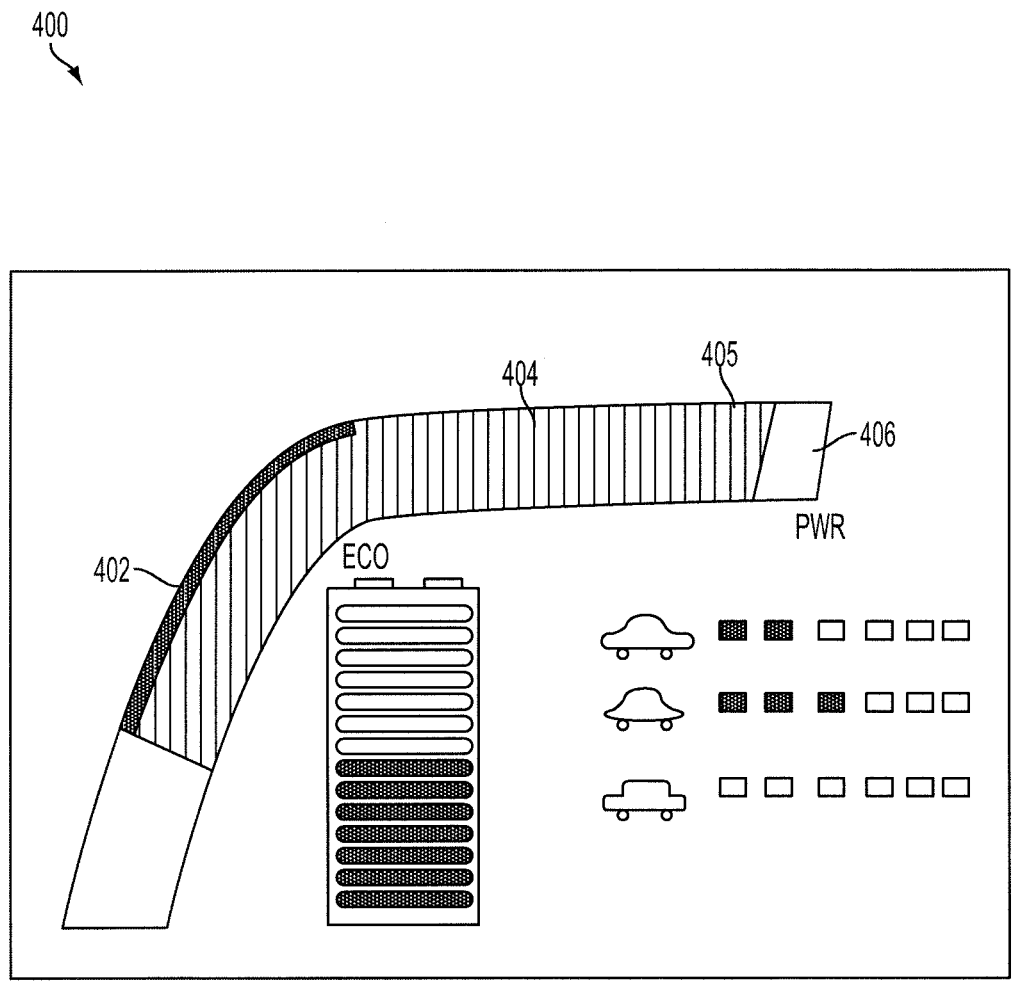
FIG. 4 is an example illustration of a graphical user interface of the indicator that notifies the driver to begin to coast according to an aspect of the invention.

The coasting guidance system 100 may render a display having one or more indicators (308). FIG. 4 illustrates a display 400 having one or more indicators 402, 404. The one or more indicators may provide coasting guidance to the driver of the vehicle 102, such as an indication to begin coasting, an indication of the current applied acceleration of the vehicle 102 and/or an indication of the recommended acceleration input to maintain the current speed of the vehicle 102. The coasting guidance system 100 may determine the current applied acceleration of the vehicle 102 based on the acceleration input information obtained from the one or more sensors 108. The applied acceleration indicator 402 may show the applied amount or percentage of acceleration, and the recommended acceleration indicator 404 ("rec indicator") may show the recommended amount or percentage of total vehicle power to attain to maintain the current speed of the vehicle 102.

The coasting guidance system 100 may use a single indicator to provide multiple different indications. A single indicator may provide multiple different indications by altering and/or changing a state of the indicator, such as change colors, flash, pulse, change shape or otherwise change and/or alter the indicator. For example, initially, the rec indicator 404 may have a filled region 405 and an unfilled region 406. The filled region 405 may represent the amount or percentage of total vehicle power that the coasting guidance system 100 recommends to apply to maintain the current speed of the vehicle 102, and the unfilled region 406 may represent the total amount or percentage of total vehicle power that may be applied. If the vehicle 102 is at or within a threshold distance of an ideal coasting location the rec indicator 404 may change colors, pulse, flash or otherwise change and/or alter into a different state to signal the driver. A pulse, for example, extends the duration of the animation on the display to signal to the driver to begin coasting.

The coasting guidance system 100 determines whether the vehicle 102 is at or within a threshold distance of the ideal coasting location based on the current location of the vehicle 102 and the determined ideal coasting location (310). The coasting guidance system 100 may extract the current location of the vehicle 102 from the vehicle information, and may compare the current location of the vehicle 102 to the determined ideal coasting location.

If the coasting guidance system 100 determines that the current location of the vehicle 102 is not at or within a threshold distance of the determined ideal coasting location, the coasting guidance system 100 continues to obtain and/or monitor the current location of the vehicle 102. If the coasting guidance system 100 determines that the current location of the vehicle 102 is at or within a threshold distance of the determined ideal coasting location, the coasting guidance system 100 may change or alter an indicator, e.g., the rec indicator 404, to signal or notify the driver to begin to coast. Other indicators, such as the applied acceleration indicator 402, may be used or similarly altered to indicate to the driver to begin to coast.

When the coasting guidance system 100 determines that the current location of the vehicle 102 is at or within the threshold distance of the determined ideal coasting location, the coasting guidance system 100 may cause the rec indicator 404 to pulse or otherwise change and/or alter a state to notify the driver to begin to coast. The coasting guidance system 100 may determine whether the size of the rec indicator 404 and/or the recommended amount or percentage of total vehicle power, Bar, when the vehicle 102 is at or within a threshold distance of the ideal coasting location, otherwise known as InitPt, is less than a threshold value (312). The initial point, InitPt, is the size of the rec indicator, Bar, and/or the recommended amount or percentage of total vehicle power at or within a threshold distance of the ideal coasting location.

Figure 5:
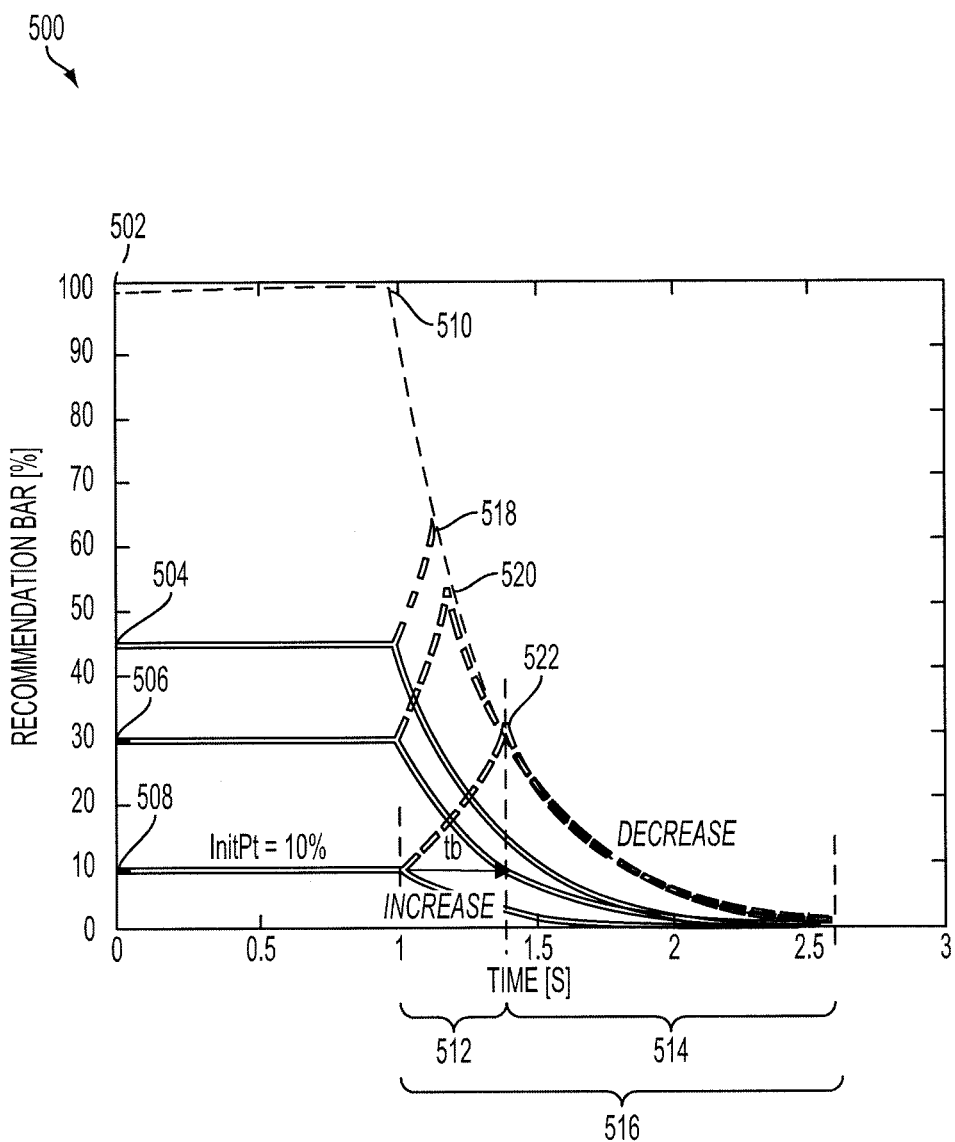
FIG. 5 is an example graph of an indicator pulsing according to an aspect of the invention.

The coasting guidance system 100 may cause the rec indicator 404 to pulse or otherwise change and/or alter a state to notify the driver to begin to coast. If the size of the rec indicator 404 and/or the recommended amount or percentage of total vehicle power is less than the threshold value, otherwise known as a short bar condition, the coasting guidance system 100 may cause the rec indicator 404 to pulse to inform the driver to begin to coast. If the size of the rec indicator 404 and/or the recommended amount or percentage of total vehicle power is greater than or equal to the threshold value, otherwise known as a long bar condition, the coasting guidance system 100 asymptotically decreases the size of the rec indicator 404 and/or the recommended amount or percentage of total vehicle power without initially pulsing to inform the driver to begin coast. By decreasing the size of the rec indicator 404, the coasting guidance system 100 indicates to the driver to release the accelerator. The threshold value may be pre-set. The threshold value may be, for example, 50%. FIG. 5 illustrates graphically an example of the pulsing of the rec indicator 404.

In order to pulse the rec indicator 404, the coasting guidance system 100 may increase the recommended amount or percentage of total power to a first value within a first time period 512, $t_b$, e.g., 0.4 seconds, so that the size of the rec indicator 404 increases from a first size to a second size, as shown in FIG. 5 (314).

By increasing the recommended amount or percentage of total power to the first value, the current size of the rec indicator 404 that corresponds to the recommended amount or percentage of total power, Bar, increases. The size of the rec indicator 404 and/or the recommended amount or percentage of total vehicle power may increase asymptotically or exponentially to the first value. The current size, Bar, is based on the size of the rec indicator 404 and/or recommended amount or percentage at or within the threshold distance of the ideal coasting location, InitPt, the difference between the current time, t, and the initial time, $t_{initial}$, where the coasting guidance system 100 initially notifies the driver to begin to coast and a factor, $tau_{increase}$, where $$tau_{increase} = \frac{-\ln(.01)}{delay},$$

such that Bar=InitPt*$e^{tau_{increase}*(t-t_{initial})}$.

For example, lines 502, 504, 506 and 508 have initial sizes and/or recommended amounts or percentages of acceleration, InitPt, of 98%, 45%, 30% and 10%, respectively. Lines 504, 506 and 508 increase within the first time period 512 to first values 518, 520 and 522, respectively, when the vehicle 102 is at or within the threshold distance of the ideal coasting location and InitPt is less than the threshold value. The lines 504, 506 and 508 may increase asymptotically or exponentially to the first values 518, 520 and 522 during the first time period 512.

Since, line 502 has an initial size and/or recommended amount or percentage of total power, InitPt, greater than or equal to the threshold value, the line 502 does not pulse and thus does not increase to a first value. Instead, line 502 decreases asymptotically or exponentially starting at point 510 at the beginning of time period 516 when the vehicle 102 is at or within a threshold distance of the ideal coasting location to indicate to the driver to begin to coast.

The first time period 512, $t_b$, may range from 0.3 seconds to 0.5 seconds, for example. The first time period 512 may be determined based on the initial size of the indicator and/or the recommended amount or percentage of total vehicle power, InitPt, when the vehicle 102 is at or within a threshold distance of the ideal coasting location, such that $$t_b = \frac{\ln(InitPt/100) + delay*tau_{increase}}{2*tau_{increase}} \text{ and } tau_{increase} = \frac{-\ln(.01)}{delay},$$

during the first time period, $t_b$. The time period 516 of the entire pulse, delay, may be approximately 1.6 s, and $tau_{increase}$ may be approximately 2.87, for example.

The coasting guidance system 100 subsequently decreases the size of the indicator and/or the recommended amount or percentage of total vehicle power, Bar, when the size of the indicator and/or the recommended amount or percentage of total vehicle power reaches or exceeds the first threshold value or after first time period 512 (316).

By decreasing the recommended amount or percentage of total vehicle power to the second threshold value, the size of the rec indicator 404 that corresponds to the recommended amount or percentage of total vehicle power decreases to a third size that is less than both the first size and the second size. The size of the rec indicator 404 and/or the recommended amount or percentage of total vehicle power may decrease asymptotically or exponentially to the second threshold value, such that the size of the rec indicator 404 and/or the recommended amount or percentage, Bar, approaches 0 over time. The coasting guidance system 100 may decreases the current size of the rec indicator 404 and/or recommended amount or percentage of total vehicle power at the end of the first time period, $t_b$. The coasting guidance system 100 updates the initial point, InitPt, to reflect the size of the rec indicator 404 and/or the recommended amount or percentage of total vehicle power at the end of the first time period, $t_b$. That is, the updated initial point, updated InitPt, is the size of the rec indicator, Bar, and/or the recommended amount or percentage of total vehicle power at the end of the first time period 512, $t_b$. The coasting guidance system 100 decreases the current size, Bar, of the rec indicator 404 and/or the recommended amount or percentage of total vehicle power based on the updated InitPt, time, t, the first time period 512, $t_b$, the initial time, $t_{initial}$, and a factor, $tau_{decrease}$, where $$tau_{decrease} = \frac{\ln(.01)}{delay} \text{ and } tau_{decrease} = \frac{\ln(.01)}{delay},$$

such that Bar=updated InitPt*$e^{tau_{decrease}*(t-t_b-t_{initial})}$. The factor, $tau_{decrease}$, may be approximately −2.87, for example.

For example, lines 504, 506 and 508 decrease during the second time period 514. The lines 504, 506 and 508 are at the first values 518, 520 and 522 at the end of the first time period 512. The lines 504, 506 and 508 may decrease asymptotically or exponentially and approach 0 as time progresses during the second time period 514.

The decrease of the size of the rec indicator 404 and/or the recommended amount or percentage of total vehicle power may occur over a second time period 514, e.g., 1.2 seconds, after the first time period 512, $t_b$, when the size of the rec indicator 404 and/or recommended amount or percentage at or within the threshold distance of the ideal coasting location, InitPt, was less than the threshold value. The second time period 514 may range from 1.1 seconds to 1.3 seconds. When the size of the indicator and/or recommended amount or percentage at or within the threshold distance of the ideal coasting location, InitPt, is greater than or equal to the threshold value, the coasting guidance system 100 may decrease the size, Bar, based on InitPt, time, t, the initial time, $t_{initial}$, and the factor, $tau_{decrease}$, over the entire time period 516, where $$tau_{decrease} = \frac{\ln(.01)}{delay},$$

such that Bar=InitPt*$e^{tau_{decrease}*(t-t_b-t_{initial})}$.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A coasting guidance system for a vehicle, comprising:
a display configured to display one or more indicators to notify a driver to begin coasting;
at least one of a navigation unit, one or more sensors or a memory configured to provide a plurality of locations of stop events; and
an electronic control unit coupled to the display and the at least one of the navigation unit, the one or more sensors or the memory and configured to:
obtain, from the at least one of the navigation unit, the one or more sensors or the memory, the plurality of locations of stop events,
determine a location of a stop event for the vehicle based on the obtained plurality of locations of stop events,
determine a braking location for the vehicle based on the location of the stop event for the vehicle,
determine an ideal coasting location for the vehicle based on the braking location for the vehicle, and
cause the one or more indicators on the display at or within a threshold distance of the ideal coasting location to indicate to the driver to begin coasting.

2. The coasting guidance system of claim 1, wherein the one or more sensors include an acceleration input sensor that monitors an applied amount or percentage of acceleration, wherein the one or more indicators include a first indicator and a second indicator; and
wherein the electronic control unit is further configured to:
obtain the applied amount or percentage of acceleration from the acceleration input sensor, and
render, on the display, the first indicator that corresponds to a recommended amount or percentage of total vehicle power and the second indicator that corresponds to the applied amount or percentage of acceleration.

3. The coasting guidance system of claim 1, wherein the electronic control unit is further configured to:
render, on the display, the one or more indicators including a first indicator having a filled region of a first size that corresponds to a recommended amount or percentage of total vehicle power.

4. The coasting guidance system of claim 3, wherein to cause the one or more indicators on the display at or within the threshold distance of the ideal coasting location to indicate to the driver to begin coasting, the electronic control unit is configured to:
increase the recommended amount or percentage of total vehicle power to a first threshold value within a first time period so that the first indicator increases; and
decrease the recommended amount or percentage of total vehicle power to a second threshold value within a second time period so that the first indicator decreases in response to the recommended amount or percentage of total vehicle power reaching or exceeding the first threshold value within the first time period.

5. The coasting guidance system of claim 4, wherein the first threshold value is greater than the second threshold value.

6. The coasting guidance system of claim 3, wherein the one or more indicators include a second indicator of a second size that corresponds to an applied amount or percentage of acceleration.

7. The coasting guidance system of claim 3, wherein to cause the one or more indicators on the display at or within the threshold distance of the ideal coasting location to indicate to the driver to begin coasting the electronic control unit is configured to:
asymptotically increase the recommended amount or percentage of total vehicle power to a first threshold value; and
after reaching or exceeding the first threshold value, asymptotically decrease the recommended amount or percentage of total vehicle power to a second threshold value.

8. The coasting guidance system of claim 1, further comprises:
wherein to determine the location of the stop event the electronic control unit is configured to:
obtain, from the navigation unit, navigational map information, and determine the location of the stop event further based on the navigational map information.

9. A method for displaying coasting guidance information on a vehicle, comprising:
obtaining, by an electronic control unit and from at least one of a navigation unit, one or more sensors or a memory, a plurality of locations of stop events;
determining, by the electronic control unit, a location of a stop event based on the obtained plurality of locations of stop events;
determining, by the electronic control unit, a braking location based on the location of the stop event;
determining, by the electronic control unit, an ideal coasting location based on the braking location; and
rendering, by the electronic control unit and on a display, one or more indicators at or within a threshold distance of the ideal coasting location to indicate to a driver to begin coasting.

10. The method of claim 9, wherein the one or more indicators include a first indicator that has a first size that corresponds to a recommended amount or percentage of total vehicle power and a second indicator that has a second size that corresponds to an applied amount or percentage of acceleration.

11. The method of claim 9, further comprising:
pulsing, by the electronic control unit and on the display, a first indicator of the one or more indicators at or within the threshold distance of the ideal coasting location.

12. The method of claim 11, wherein pulsing the first indicator at or within the threshold distance of the ideal coasting location comprises:
increasing, by the electronic control unit and on the display, a size of the first indicator to a first threshold value within a first time; and
decreasing, by the electronic control unit and on the display, the size of the first indicator to a second threshold value within a second time in response to the size of the first indicator of the display being greater than or equal to the first threshold value within the first time.

13. The method of claim 11, wherein pulsing the first indicator at or within the threshold distance of the ideal coasting location comprises:
asymptotically increasing, by the electronic control unit and on the display, a size of the first indicator; and
after asymptotically increasing the size of the first indicator, asymptotically decreasing, by the electronic control unit and on the display, the size of the first indicator.

14. The method of claim 9, further comprising:
changing, by the electronic control unit and on the display, a first indicator of the one or more indicators at or within the threshold distance of the ideal coasting location to indicate to the driver to begin coasting, wherein changing the first indicator includes at least one of changing a color or contrast of the first indicator, flashing the first indicator or pulsing the first indicator.

15. The method of claim 9, further comprising:
determining, by the electronic control unit, that a recommended amount or percentage of total vehicle power is less than a threshold value; and
pulsing, by the electronic control unit and on the display, a first indicator of the one more indicators at or within the threshold distance of the ideal coasting location to indicate to the driver to begin coasting.

16. A coasting guidance system for a vehicle, comprising:
a memory configured to store a plurality of locations of stop events;
a display configured to display an indicator to notify a driver to begin to coast; and
an electronic control unit coupled to the display and the memory, the electronic control unit being configured to:
    determine a location of a stop event based on a current location of the vehicle and the plurality of locations of stop events,
    determine a braking location based on the location of the stop event,
    determine an ideal coasting location based on the braking location,
    determine that a recommended amount or percentage of total vehicle power is less than a threshold percentage, and
    cause the indicator on the display to pulse at or within a threshold distance of the ideal coasting location to indicate to the driver to begin to coast.

17. The coasting guidance system of claim 16, wherein the threshold percentage is a pre-set threshold percentage.

18. The coasting guidance system of claim 16, wherein to cause the indicator on the display to pulse the electronic control unit is configured to:
asymptotically increase the recommended amount or percentage of total vehicle power to a first threshold value; and
after reaching or exceeding the first threshold value, asymptotically decrease the recommended amount or percentage of total vehicle power to a second threshold value.

19. The coasting guidance system of claim 18, wherein the second threshold value is 0 and the first threshold value is based on the recommended amount or percentage of total vehicle power at or within a threshold distance of the ideal coasting location.

20. The coasting guidance of claim 16, wherein the braking location is a location where capture of regenerative energy is maximized.

* * * * *